(12) United States Patent
Al Majid et al.

(10) Patent No.: US 12,438,837 B2
(45) Date of Patent: *Oct. 7, 2025

(54) MESSAGE REMINDER INTERFACE

(71) Applicant: Snap Inc., Santa Monica, CA (US)

(72) Inventors: Newar Husam Al Majid, New York, NY (US); Laurent Desserrey, Los Angeles, CA (US); Christie Marie Heikkinen, Sherman Oaks, CA (US); Nathaniel Parrott, Brooklyn, NY (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,127

(22) Filed: Feb. 12, 2024

(65) Prior Publication Data
US 2024/0187362 A1 Jun. 6, 2024

Related U.S. Application Data

(63) Continuation of application No. 17/964,717, filed on Oct. 12, 2022, now Pat. No. 11,956,192, which is a
(Continued)

(51) Int. Cl.
*H04L 51/18* (2022.01)
*H04L 51/043* (2022.01)
(Continued)

(52) U.S. Cl.
CPC ............ *H04L 51/18* (2013.01); *H04L 51/043* (2013.01); *H04L 51/224* (2022.05); *H04L 51/42* (2022.05); *G06Q 10/10* (2013.01)

(58) Field of Classification Search
CPC ....... G06Q 10/10; H04L 51/07; H04L 51/224; H04L 51/42; H04L 51/234; H04L 51/04; H04L 51/043; H04L 51/21; H04L 51/216
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |

(Continued)

FOREIGN PATENT DOCUMENTS

| | | |
|---|---|---|
| CN | 1627851 A | 6/2005 |
| CN | 105991419 A | 10/2016 |

(Continued)

OTHER PUBLICATIONS

"U.S. Appl. No. 16/538,375, Non Final Office Action mailed Jun. 15, 2020", 7 pgs.
(Continued)

*Primary Examiner* — David R Lazaro
(74) *Attorney, Agent, or Firm* — Schwegman Lundberg & Woessner, P.A.

(57) ABSTRACT

A message reminder system, to perform operations that include: causing display of a presentation of a message addressed to a user, at a first position among a message feed of the user at a client device; receiving a request to open the message from the user of the client device, the request including a timestamp; detecting a trigger event based on at least the timestamp of the request to open the message, the trigger event comprising event attributes; generating a notification to be applied to the presentation of the message, the notification based on at least the event attributes of the trigger event; moving the presentation of the message from the first position among the message feed to a second position among the message feed; and applying the notification to the presentation of the message.

17 Claims, 10 Drawing Sheets

Related U.S. Application Data continuation of application No. 17/114,003, filed on Dec. 7, 2020, now Pat. No. 11,588,772, which is a continuation of application No. 16/538,375, filed on Aug. 12, 2019, now Pat. No. 10,911,387.

(51) Int. Cl.
*H04L 51/224* (2022.01)
*H04L 51/42* (2022.01)
*G06Q 10/10* (2023.01)

(56) References Cited

U.S. PATENT DOCUMENTS

| | | | |
|---|---|---|---|
| 6,223,165 B1 | 4/2001 | Lauffer | |
| 6,772,195 B1 | 8/2004 | Hatlelid et al. | |
| 6,842,779 B1 | 1/2005 | Nishizawa | |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van et al. | |
| 7,859,551 B2 | 12/2010 | Bulman et al. | |
| 7,885,931 B2 | 2/2011 | Seo et al. | |
| 7,908,554 B1* | 3/2011 | Blattner | G06Q 10/107 715/706 |
| 7,921,174 B1* | 4/2011 | Denise | G06Q 10/107 709/224 |
| 7,925,703 B2 | 4/2011 | Dinan et al. | |
| 8,005,729 B1* | 8/2011 | Ulm | H04M 1/72448 715/765 |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,116,744 B1* | 2/2012 | Mikan | H04M 3/5335 455/412.2 |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,713,124 B1* | 4/2014 | Weiss | G06Q 10/107 715/752 |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,042,923 B1* | 5/2015 | Mirho | H04M 1/72436 455/418 |
| 9,086,776 B2 | 7/2015 | Ye et al. | |
| 9,105,014 B2 | 8/2015 | Collet et al. | |
| 9,166,892 B1* | 10/2015 | Prado | H04L 51/23 |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,363,378 B1* | 6/2016 | McDaniel | H04M 3/533 |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,547,763 B1* | 1/2017 | Avital | H04L 63/0861 |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,652,809 B1* | 5/2017 | Levinson | G06Q 50/01 |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,250,537 B2* | 4/2019 | Young | G06T 13/40 |
| 10,262,250 B1 | 4/2019 | Spiegel et al. | |
| 10,362,219 B2 | 7/2019 | Wilson et al. | |
| 10,374,994 B1* | 8/2019 | Viklund | H04L 51/18 |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,657,701 B2 | 5/2020 | Osman et al. | |
| 10,748,322 B1* | 8/2020 | Pishevar | G06T 11/00 |
| 10,911,387 B1* | 2/2021 | Al Majid | H04L 51/18 |
| 10,979,375 B2* | 4/2021 | Young | H04L 51/10 |
| 11,588,772 B2* | 2/2023 | Al Majid | H04L 51/224 |
| 11,956,192 B2* | 4/2024 | Al Majid | H04L 51/42 |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0135136 A1* | 6/2006 | Kim | H04M 1/7243 455/414.1 |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0014982 A1* | 1/2008 | Foxenland | G06Q 10/107 455/550.1 |
| 2008/0158222 A1 | 7/2008 | Li et al. | |
| 2009/0016617 A1 | 1/2009 | Bregman-Amitai et al. | |
| 2009/0055484 A1* | 2/2009 | Vuong | G06Q 10/107 345/619 |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |

(56) References Cited

U.S. PATENT DOCUMENTS

| | | | |
|---|---|---|---|
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2010/0333037 A1* | 12/2010 | Pavlovski | G06F 3/0481 715/848 |
| 2011/0093780 A1 | 4/2011 | Dunn | |
| 2011/0115798 A1 | 5/2011 | Nayar et al. | |
| 2011/0119258 A1* | 5/2011 | Forutanpour | H04L 51/48 707/723 |
| 2011/0148864 A1 | 6/2011 | Lee et al. | |
| 2011/0239136 A1 | 9/2011 | Goldman et al. | |
| 2011/0296324 A1* | 12/2011 | Goossens | G06Q 50/01 715/763 |
| 2012/0054631 A1* | 3/2012 | Nurmi | G06F 3/0481 715/744 |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0055112 A1* | 2/2013 | Joseph | H04L 12/1827 715/758 |
| 2013/0103760 A1 | 4/2013 | Golding et al. | |
| 2013/0159408 A1* | 6/2013 | Winn | G06N 20/00 709/204 |
| 2013/0201187 A1 | 8/2013 | Tong et al. | |
| 2013/0249948 A1 | 9/2013 | Reitan | |
| 2013/0257877 A1 | 10/2013 | Davis | |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2014/0143682 A1* | 5/2014 | Druck | G06Q 30/0241 715/752 |
| 2015/0040021 A1 | 2/2015 | Yang et al. | |
| 2015/0186012 A1 | 7/2015 | Coleman et al. | |
| 2015/0200899 A1* | 7/2015 | Sanketi | H04L 51/224 709/206 |
| 2015/0206349 A1 | 7/2015 | Rosenthal et al. | |
| 2016/0026352 A1* | 1/2016 | Brown | H04L 51/52 715/752 |
| 2016/0127280 A1* | 5/2016 | Nair | H04L 51/216 709/206 |
| 2016/0134840 A1 | 5/2016 | Mcculloch | |
| 2016/0234149 A1 | 8/2016 | Tsuda et al. | |
| 2016/0344668 A1* | 11/2016 | Young | H04L 67/306 |
| 2017/0080346 A1 | 3/2017 | Abbas | |
| 2017/0087473 A1 | 3/2017 | Siegel et al. | |
| 2017/0093783 A1* | 3/2017 | Sachidanandam | H04L 51/226 |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Deusen et al. | |
| 2017/0310934 A1 | 10/2017 | Du et al. | |
| 2017/0312634 A1 | 11/2017 | Ledoux et al. | |
| 2018/0006989 A1* | 1/2018 | Dotan-Cohen | H04L 51/04 |
| 2018/0026925 A1* | 1/2018 | Kennedy | G06V 40/174 715/753 |
| 2018/0047200 A1 | 2/2018 | O'hara et al. | |
| 2018/0107342 A1* | 4/2018 | Deets, Jr. | H04L 51/234 |
| 2018/0113587 A1 | 4/2018 | Allen et al. | |
| 2018/0115503 A1 | 4/2018 | Baldwin et al. | |
| 2018/0260109 A1 | 9/2018 | Yang et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2018/0335930 A1* | 11/2018 | Scapel | H04L 51/10 |
| 2018/0336715 A1 | 11/2018 | Rickwald et al. | |
| 2018/0337918 A1* | 11/2018 | Chang | H04L 63/108 |
| 2019/0001223 A1 | 1/2019 | Blackstock et al. | |
| 2019/0026056 A1* | 1/2019 | Wang | G06F 1/1637 |
| 2019/0057616 A1 | 2/2019 | Cohen et al. | |
| 2019/0172014 A1* | 6/2019 | Sohn | H04L 51/224 |
| 2019/0188920 A1 | 6/2019 | Mcphee et al. | |
| 2019/0196693 A1* | 6/2019 | Yang | H04L 51/046 |
| 2019/0312830 A1* | 10/2019 | Young | G06F 16/9535 |
| 2020/0145458 A1* | 5/2020 | Kumar | H04L 63/145 |
| 2021/0051127 A1* | 2/2021 | Al Majid | H04L 51/42 |
| 2021/0092085 A1* | 3/2021 | Al Majid | H04L 51/224 |
| 2023/0035260 A1 | 2/2023 | Al Maj et al. | |

FOREIGN PATENT DOCUMENTS

| | | |
|---|---|---|
| CN | 106203947 A | 12/2016 |
| CN | 109863532 A | 6/2019 |
| CN | 110168478 A | 8/2019 |
| CN | 114258666 A | 3/2022 |
| EP | 2184092 A2 | 5/2010 |
| EP | 4014444 B1 | 10/2024 |
| JP | 2001230801 A | 8/2001 |
| JP | 5497931 B2 | 3/2014 |
| KR | 101445263 B1 | 9/2014 |
| KR | 102728008 B1 | 11/2024 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2015183499 A1 | 12/2015 |
| WO | WO-2016090605 A1 | 6/2016 |
| WO | WO-2018005028 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2021030841 A1 | 2/2021 |

OTHER PUBLICATIONS

"U.S. Appl. No. 16/538,375, Notice of Allowance mailed Oct. 1, 2020", 8 pgs.

"U.S. Appl. No. 16/538,375, Response filed Sep. 17, 2020 to Non Final Office Action mailed Jun. 15, 2020".

"U.S. Appl. No. 17/114,003, Non Final Office Action mailed Jun. 17, 2022", 13 pgs.

"U.S. Appl. No. 17/114,003, Notice of Allowance mailed Sep. 19, 2022", 7 pgs.

"U.S. Appl. No. 17/114,003, Response filed Jul. 13, 2022 to Non Final Office Action mailed Jun. 17, 2022", 10 pgs.

"U.S. Appl. No. 17/114,003, Supplemental Notice of Allowability mailed Jan. 19, 2023", 4 pgs.

"U.S. Appl. No. 17/964,717, Final Office Action mailed Aug. 11, 2023", 12 pgs.

"U.S. Appl. No. 17/964,717, Non Final Office Action mailed Jun. 21, 2023", 17 pgs.

"U.S. Appl. No. 17/964,717, Notice of Allowance mailed Nov. 15, 2023", 11 pgs.

"U.S. Appl. No. 17/964,717, Response filed Jul. 31, 2023 to Non Final Office Action mailed Jun. 21, 2023", 10 pgs.

"U.S. Appl. No. 17/964,717, Response filed Oct. 5, 2023 to Final Office Action mailed Aug. 11, 2023", 10 pgs.

"Chinese Application Serial No. 202080056788.1, Decision of Rejection mailed Jan. 10, 2024", W/English Translation, 9 pgs.

"Chinese Application Serial No. 202080056788.1, Office Action mailed Feb. 4, 2023", w/ English Translation, 12 pgs.

"Chinese Application Serial No. 202080056788.1, Office Action mailed Aug. 21, 2023", W/English Translation, 8 pgs.

(56) References Cited

OTHER PUBLICATIONS

"Chinese Application Serial No. 202080056788.1, Response filed Jun. 19, 2023 to Office Action mailed Feb. 4, 2023", w/ English claims, 14 pgs.

"Chinese Application Serial No. 202080056788.1, Response filed Nov. 6, 2023 to Office Action mailed Aug. 21, 2023", w/ English claims, 13 pgs.

"European Application Serial No. 20851657.5, Extended European Search Report mailed Aug. 30, 2022", 7 pgs.

"International Application Serial No. PCT/US2020/070401, International Preliminary Report on Patentability mailed Feb. 24, 2022", 7 pgs.

"International Application Serial No. PCT/US2020/070401, International Search Report mailed Nov. 17, 2020", 3 pgs.

"International Application Serial No. PCT/US2020/070401, Written Opinion mailed Nov. 17, 2020", 5 pgs.

"Korean Application Serial No. 10-2022-7007564, Notice of Preliminary Rejection mailed Jan. 18, 2024", w/ English Translation, 9 pgs.

"European Application Serial No. 24200410.9, Extended European Search Report mailed Jan. 28, 2025", 6 pgs.

"Korean Application Serial No. 10-2022-7007564, Response filed Mar. 18, 2024 to Notice of Preliminary Rejection mailed Jan. 18, 2024", w/ English claims, 20 pgs.

"Korean Application Serial No. 10-2024-7036871, Notice of Preliminary Rejection mailed Nov. 25, 2024", w/ English Translation, 5 pgs.

\* cited by examiner

400

CAUSING DISPLAY OF A PRESENTATION OF A MESSAGE AT FIRST POSITION AMONG A MESSAGE FEED AT A CLIENT DEVICE
402

RECEIVING A REQUEST TO OPEN THE MESSAGE FROM THE CLIENT DEVICE, THE REQUEST INCLUDING A TIMESTAMP
404

DETECTING A TRIGGER EVENT BASED ON THE TIMESTAMP OF THE REQUEST, THE TRIGGER EVENT COMPRISING EVENT ATTRIBUTES
406

GENERATING A NOTIFICATION TO BE APPLIED TO THE PRESENTATION OF THE MESSAGE IN RESPONSE TO THE DETECTING THE TRIGGER EVENT, THE NOTIFICATION BASED ON THE EVENT ATTRIBUTES OF THE TRIGGER EVENT
408

MOVING THE PRESENTATION OF THE MESSAGE FROM THE FIRST POSITION TO A SECOND POSITION AMONG THE MESSAGE FEED
410

APPLYING THE NOTIFICATION TO THE PRESENTATION OF THE MESSAGE
412

```
┌─────────────────────────────────────────────────────────────┐
│ IDENTIFYING A TRIGGER CONDITION BASED ON MESSAGE CONTENT OF │
│                        THE MESSAGE                          │
│                            502                              │
└─────────────────────────────────────────────────────────────┘
                              │
                              ▼
┌─────────────────────────────────────────────────────────────┐
│ DETERMINING A PERIOD OF TIME FROM THE REQUEST TRANSGRESSES A│
│    THRESHOLD VAUE BASED ON THE TIMESTAMP OF THE REQUEST     │
│                            504                              │
└─────────────────────────────────────────────────────────────┘
```

ACCESSING AN AVATAR ASSOCIATED WITH A SENDER OF THE MESSAGE IN RESPONSE TO THE DETECTING THE TRIGGER EVENT, THE AVATAR COMPRISING A PLURALITY OF GRAPHICAL ELEMENTS
602

CONFIGURING THE PLURALITY OF GRAPHICAL ELEMENTS BASED ON THE EVENT ATTRIBUTES OF THE TRIGGER EVENT
604

PRESENTING THE AVATAR AT A POSITION WITHIN THE NOTIFICATION AT THE CLIENT DEVICE
606

*FIG. 6*

MESSAGE REMINDER INTERFACE

CROSS-REFERENCE TO RELATED

This application is a continuation of U.S. patent application Ser. No. 17/964,717, filed Oct. 12, 2022, which application is a continuation of U.S. patent application Ser. No. 17/114,003, filed Dec. 7, 2020, now issued as U.S. Pat. No. 11,588,772, which application is a continuation of U.S. patent application Ser. No. 16/538,375, filed Aug. 12, 2019, now issued as U.S. Pat. No. 10,911,387, on Feb. 2, 2021, which applications are incorporated herein by reference in their entirety.

TECHNICAL FIELD

Embodiments of the present disclosure relate generally to graphical user interfaces, and more specifically to interface elements presented within graphical user interfaces.

BACKGROUND

A graphical user interface (GUI) is a form of user interface that allows users to interact with electronic devices through graphical icons and visual indicators instead of purely text-based user interfaces, typed command labels, or text navigation.

Instant messaging (IM) technology is a type of online chat that offers real-time text transmission over the Internet. Short messages are typically transmitted between parties through respective client devices and presented within GUIs. Some IM applications can use push technology to provide real-time text, which transmits messages character by character, as they are composed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for presenting a message reminder, according to certain example embodiments.

FIG. 5 is a flowchart illustrating a method for presenting a message reminder, according to certain example embodiments.

FIG. 6 is a flowchart illustrating a method for presenting a message reminder, according to certain example embodiments.

DETAILED DESCRIPTION

Figure 1:
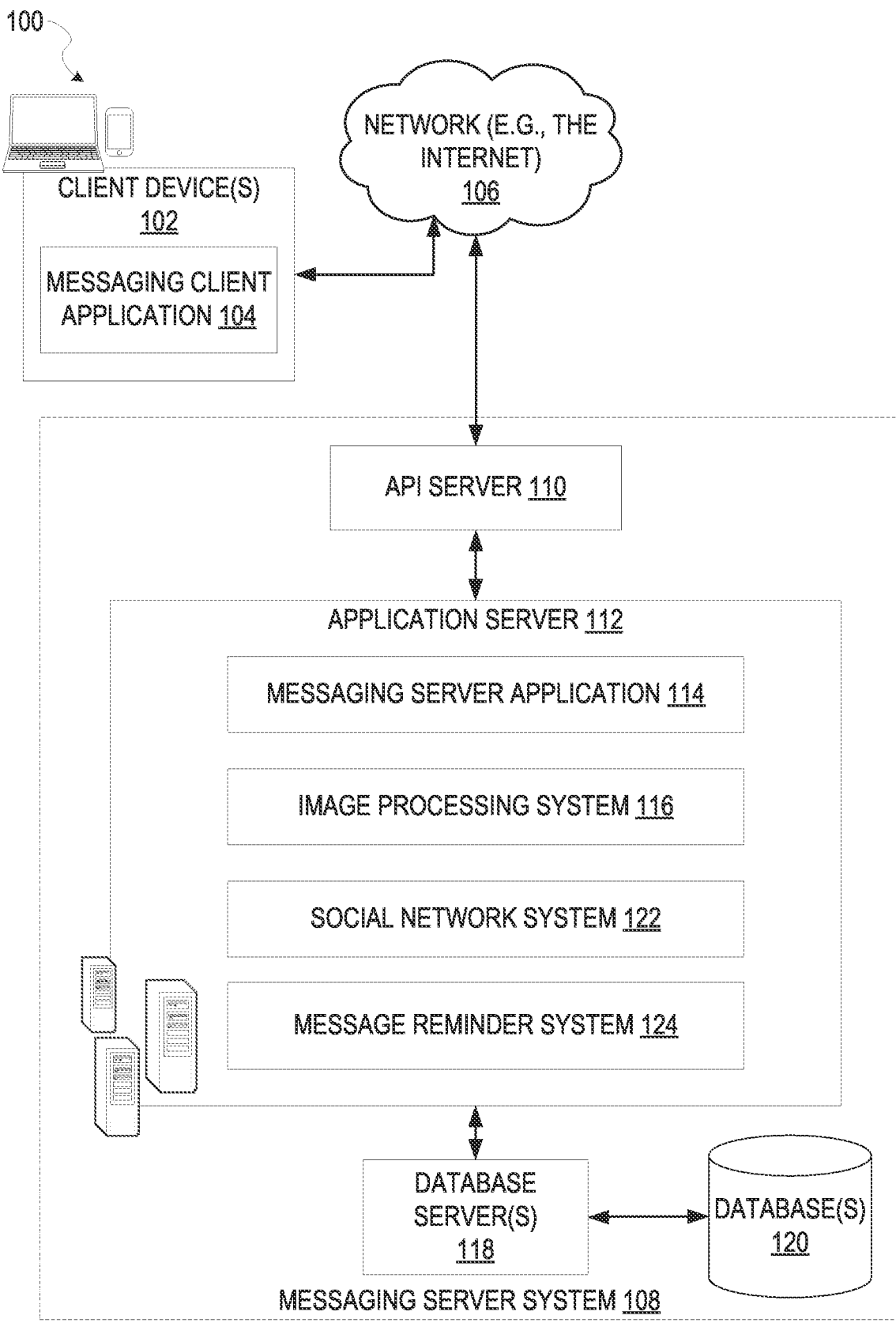
FIG. 1 is a block diagram showing an example messaging system for exchanging data (e.g., messages and associated content) over a network in accordance with some embodiments, wherein the messaging system includes a message reminder system.

As discussed above, GUIs are a form of user interface that allows users to interact with electronic devices through graphical icons and visual indicators instead of purely text-based user interfaces, typed command labels, or text navigation. Messaging applications typically present messages to users within GUI configured to present a list of messages received by the user. These messages are often presented in chronological order, as the user receives them.

As reliance on messaging applications increases, the velocity in which users may send and receive messages also increases, resulting in large numbers of messages being presented within a message feed of a GUI at a client device. Recipients of these messages may often forget to reply to a message as a result of the rate in which messages are received. Accordingly, a system to determine when a user may have forgotten to respond to a message in order to provide reminders is discussed herein.

Example embodiments described herein relate to systems and methods for a message reminder system, to perform operations that include: causing display of a presentation of a message addressed to a user, at a first position among a message feed of the user at a client device; receiving a request to open the message from the user of the client device, the request including a timestamp; detecting a trigger event based on at least the timestamp of the request to open the message, the trigger event comprising event attributes; generating a notification to be applied to the presentation of the message, the notification based on at least the event attributes of the trigger event; moving the presentation of the message from the first position among the message feed to a second position among the message feed; and applying the notification to the presentation of the message.

Trigger events may be defined as the presence of one or more signals that indicate a user may have forgotten to reply to a message. The trigger events may each be defined by a corresponding set of trigger conditions. For example, if a user opens a chat message from a sender, does not reply to the message, and:

The user saved the last message received from the sender, or;

The user did not complete the loading of the latest message the user received (resulting in an error), or;

The user has not sent a message to the sender of the message within a threshold period of time from the sender sending the message to the user, or;

The message received by the user ends contains predefined trigger content, such as a question mark, or a specific text string, or;

The message transgresses a threshold size (i.e., number of words, or MB), and;

It has been a threshold period of time since the user opened the message from the sender.

Responsive to detecting a trigger event based on a set of trigger conditions, the message reminder system identifies a message corresponding to the trigger event and moves a presentation of the message from a first position among a set of messages to a second position among the set of messages. The first position may for example be chronological based on a timestamp associated with the message, and the second position may be at a most visible position at the top of the message feed.

In some embodiments, the presentation of the message may include a display of an identifier associated with a sender of the message. The identifier may include a username, as well as a graphical icon, such as a user avatar. In some embodiments, the message reminder system may alter the display of the user identifier based on attributes of the trigger event. For example, the trigger event may include one or more event attributes such as a period of time since the user has opened a message without responding to the message. As the period of time transgresses one or more threshold values, the message reminder system may modify the user identifier based on the one or more threshold values.

As an illustrative example, the user identifier may include a graphical user avatar depicting a face. As the period of time transgresses a first threshold value, the graphical user avatar may be modified to appear disappointed. As the period of time transgresses a second threshold value, the graphical avatar may be modified to appear sad. As the period of time transgresses a third threshold, the graphical avatar may be modified to appear angry.

In some embodiments, the message reminder system may generate a reminder notification to be applied to the display of the message among a set of messages. The reminder notification may include one or more of the event attributes of the trigger event, such as a period of that that has passed since the user opened a message without responding.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a message reminder system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
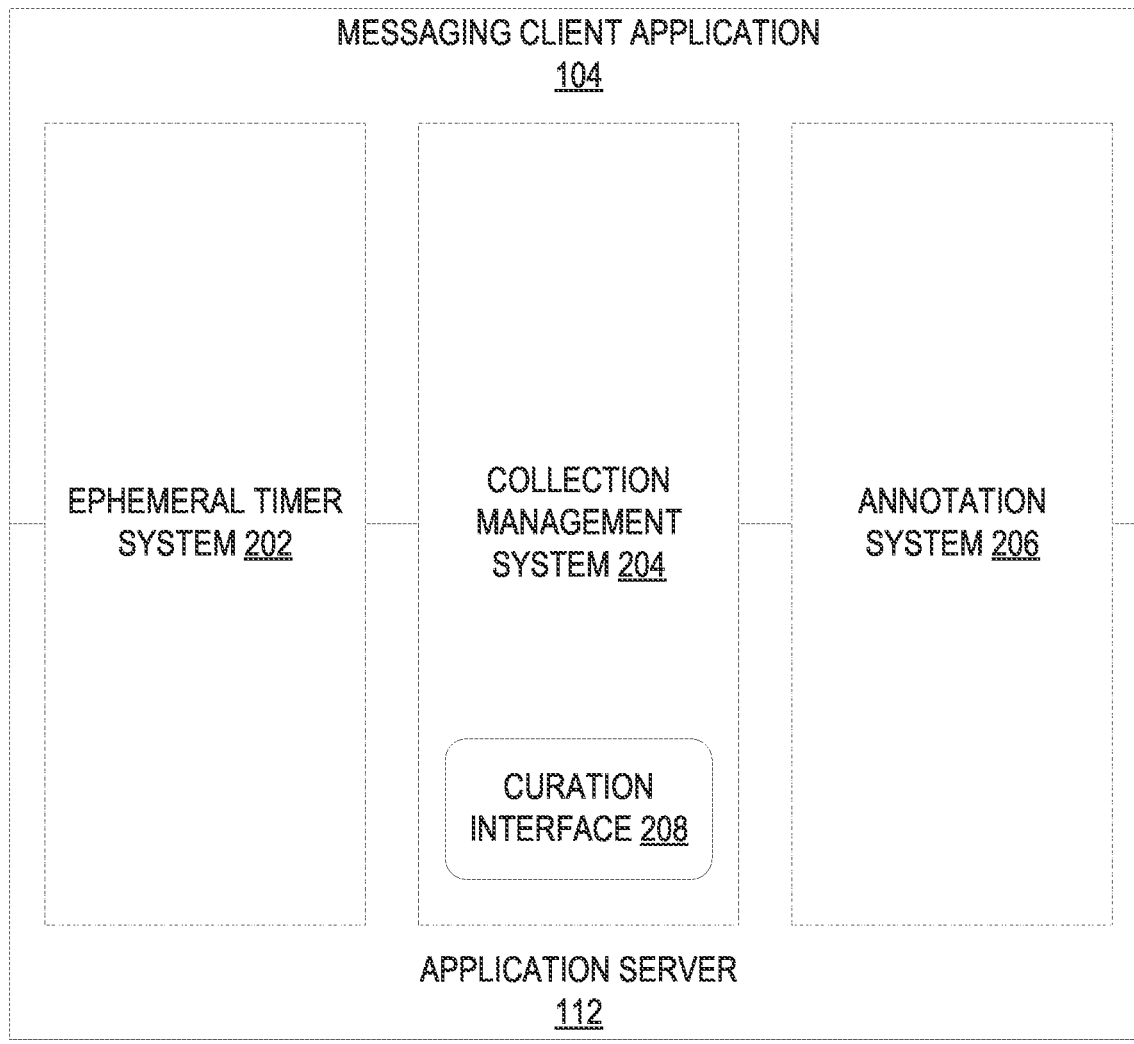
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content, such as user support content received by the user to be forwarded or redistributed to one or more recipients. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
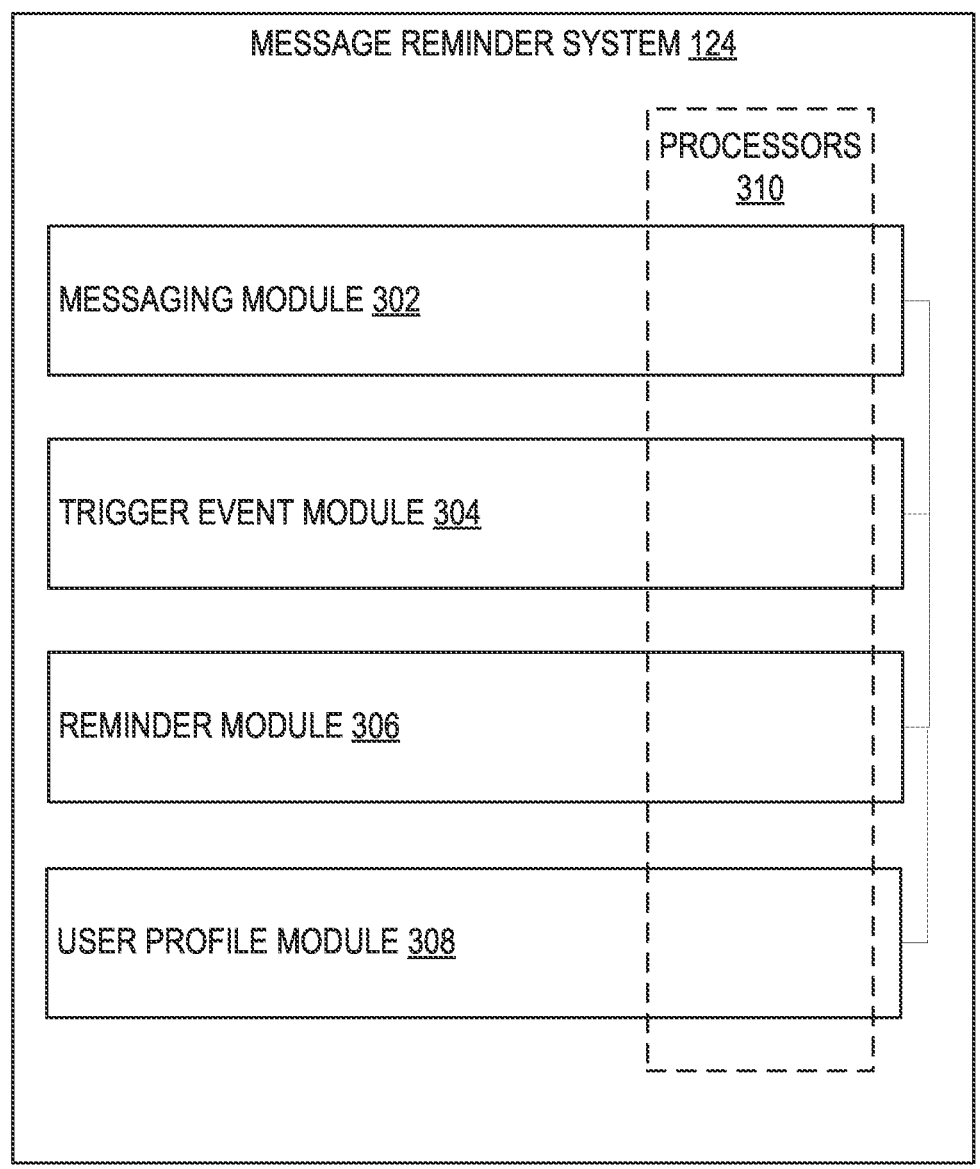
FIG. 3 is a block diagram illustrating various modules of a message reminder system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the message reminder system 124 that configure the message reminder system 124 to perform operations that include: causing display of a presentation of a message addressed to a user, at a first position among a message feed of the user at a client device; receiving a request to open the message from the user of the client device, the request including a timestamp; detecting a trigger event based on at least the timestamp of the request to open the message, the trigger event comprising event attributes; generating a notification to be applied to the presentation of the message, the notification based on at least the event attributes of the trigger event; moving the presentation of the message from the first position among the message feed to a second position among the message feed; and applying the notification to the presentation of the message.

The message reminder system 124 is shown as including a messaging module 302, a trigger event module 304, a reminder module 306, and a user profile module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the message reminder system 124 may physically include an arrangement of one or more of the processors 310 (e.g., a subset of or among the one or more processors of the machine) configured to perform the operations described herein for that module. As another example, any module of the message reminder system 124 may include software, hardware, or both, that configure an arrangement of one or more processors 310 (e.g., among the one or more processors of the machine) to perform the operations described herein for that module. Accordingly, different modules of the message reminder system 124 may include and configure different arrangements of such processors 310 or a single arrangement of such processors 310 at different points in time. Moreover, any two or more modules of the message reminder system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for presenting a message reminder, according to certain example embodiments. Operations of the method 400 may be performed by the modules described above with respect to FIG. 3. As shown in FIG. 4, the method 400 includes one or more operations 402, 404, 406, 408, 410, and 412.

At operation 402, the messaging module 302 causes display of a presentation of a message at a first position among a message feed at a client device 102. For example, the message may be received by the user of the client device 102 from a sender associated with the message and may be presented in the message feed chronologically based on a time in which the user received the message.

At operation 404, the messaging module 302 receives a request to open the message from the client device 102, wherein the request to open the message comprises a timestamp. The user may then forget to (or simply choose not to) reply to the message and close the message.

At operation 406, the trigger event module 304 detects a trigger event based on at least the timestamp of the request, wherein the trigger event comprises event attributes. The event attributes may for example include a period of time since the user opened the message (based on the request to open the message), content of the message, and a loading status of the message. For example, the loading status may indicate an error in loading the message (i.e., the message content of the message did not completely load at the client device 102).

At operation 408, the reminder module 306 and the user profile module 308 generate a notification to be applied to the presentation of the message in response to the trigger event module 304 detecting the trigger event, wherein the notification is based on the event attributes of the trigger event.

For example, the notification may comprise a display of a user identifier associated with the sender of the message, as well as an indication of a period of time since the user received the message, and a period of time since the request to open the message.

At operation 410, the messaging module 302 moves the presentation of the message from the first position among the set of messages of the message feed to a second position among the set of messages of the message feed. For example, the second position may be a top-most position typically reserved for the "most recent" chronological message. At operation 412 the messaging module 302 applies the notification to the presentation of the message.

FIG. 5 is a flowchart illustrating a method 500 for presenting a message reminder, according to certain example embodiments. Operations of the method 500 may be performed by the modules described above with respect to FIG. 3. As shown in FIG. 5, the method 500 includes one or more operations 502, and 504 which may be performed as a part of operation 406 of the method 400 depicted in FIG. 4.

At operation 502, the trigger event module 304 identifies a trigger condition based on at least the message content of the message. For example the message content of the message may comprise a word count, a data size, as well as one or more text characters and glyphs. In some embodiments, a trigger event may include a set of trigger conditions based on the message content of the message. As an illustrative example, the presence of a question mark may be a trigger condition. Similarly, a word count or data size that transgresses a threshold value may be a trigger condition.

In some embodiments, as discussed above, the trigger conditions may also comprise one or more of the following conditions:

The user saved the last message received from the sender, or;

The user did not complete the loading of the latest message the user received, or;

The user has not sent a message to the sender of the message within a threshold period of time from the sender sending the message to the user, or;

The message received by the user ends contains predefined trigger content, such as a question mark, or a specific text string, or;

The message transgresses a threshold size (i.e., number of words, or MB), and;

It has been a threshold period of time since the user opened the message from the sender.

At operation 504, the trigger event module 304 determines a period of time since the request to open the message transgresses a threshold value based on the timestamp of the request to open the message.

At operation 406 of the method 400, the trigger event module 304 detects the trigger event responsive to the identification of the trigger condition, and the determination that the period of time transgresses the threshold value.

FIG. 6 is a flowchart illustrating a method 600 for presenting a message reminder, according to certain example embodiments. Operations of the method 600 may be performed by the modules described above with respect to FIG. 3. As shown in FIG. 6, the method 600 includes one or more operations 602, and 604 which may be performed as a part of operation 408 of the method 400 depicted in FIG. 4.

At operation 602, the user profile module 308 accesses an avatar associated with a sender of a message in response to the trigger event module 304 detecting the trigger event, wherein the avatar comprises a plurality of graphical elements. For example, the sender may provide inputs to define the avatar by selecting each of the plurality of graphical elements.

At operation 604, the reminder module 306 configures the plurality of graphical elements based on the event attributes of the trigger event. For example, the event attribute may include a period of time since the request to open the message, as well as a word count of the message.

At operation 606, the reminder module 306 presents the configured avatar at a position within the notification at the client device 102.

Figure 7:
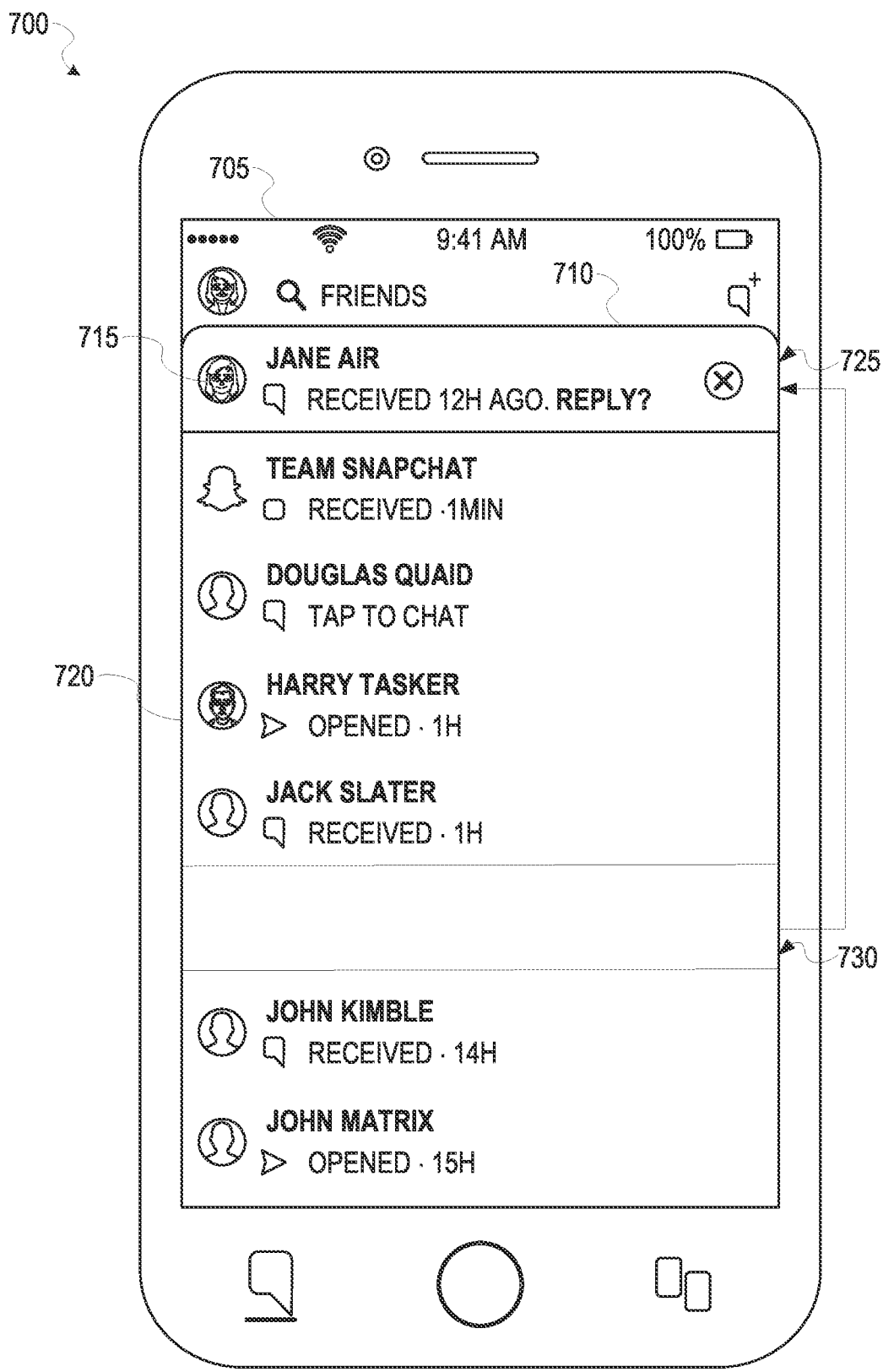
FIG. 7 is an interface diagram depicting a message reminder interface, according to certain example embodiments.

FIG. 7 is an interface diagram 700 depicting a message reminder interface 705, according to certain example embodiments, and as described in the methods 400, 500, and 600 as depicted in FIGS. 4, 5, and 6.

As seen in the interface diagram 700, a presentation of a message 710 may be moved from a first position among the set of messages 720 to a second position among the set of messages 720 responsive to the detection of a trigger event.

Figure 8:
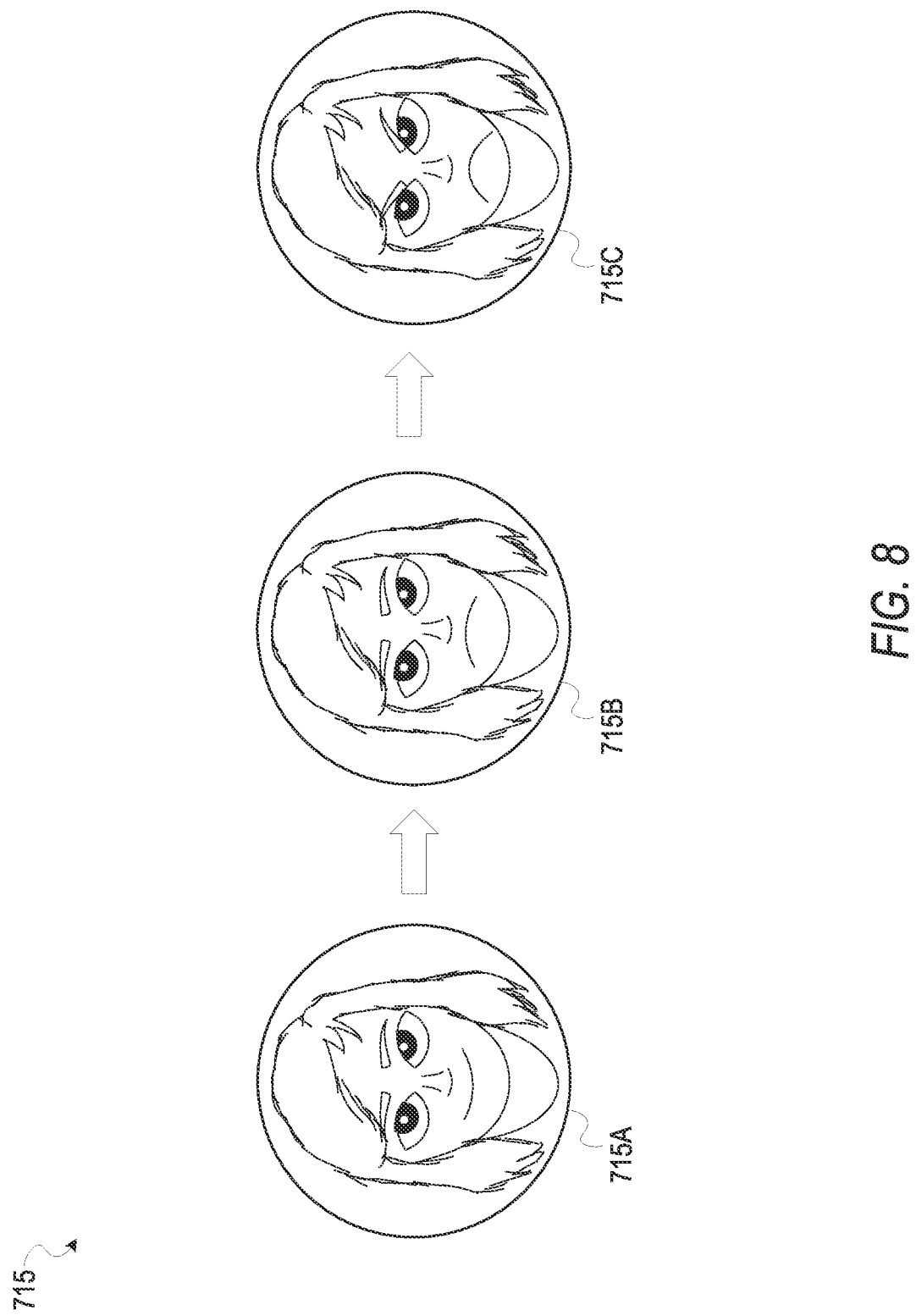
FIG. 8 is a flow diagram depicting a user identifier to be presented in a message reminder interface, according to certain example embodiments.

As discussed in the method 600, the presentation of the message 710 may include a display of a user identifier, such as the user avatar 715, wherein the user avatar 715 may be configured based on event attributes of the trigger event. For example, the user avatar may be modified based on a period of time that has passed since the user opened the message. FIG. 8 provides an illustration of how the user avatar 715 may be modified based on the period of time.

As seen in FIG. 7, the graphical elements of the user avatar 715 may initially be configured as depicted in the user avatar state 715A. Responsive to detecting the period of time since opening the message transgress a first threshold value, the user avatar 715 may be configured as depicted in the user avatar state 715B. Similarly, responsive to detecting the period of time transgress a second threshold value, the user avatar 715 may be configured as depicted in the user avatar state 715C.

Software Architecture

Figure 9:
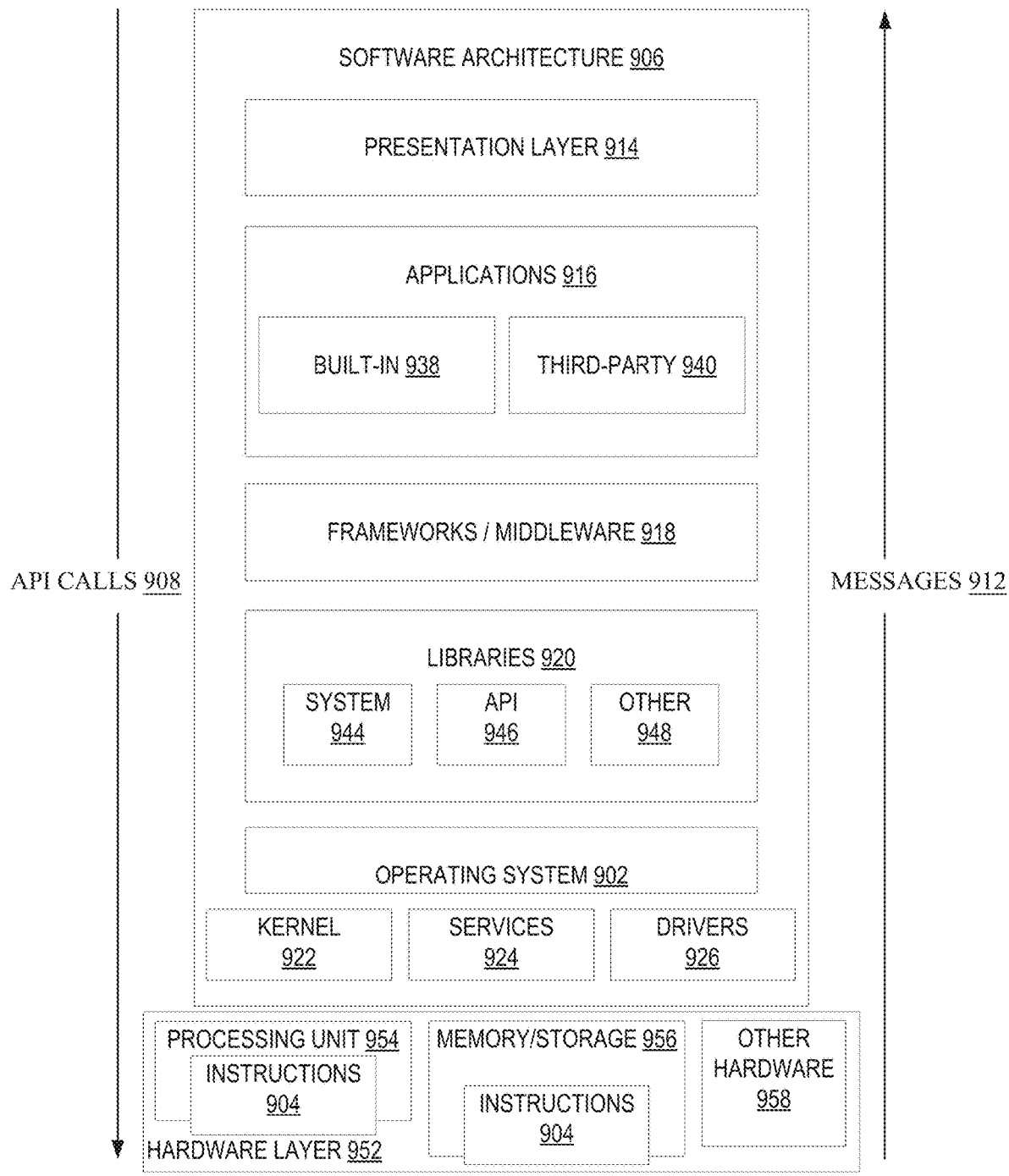
FIG. 9 is a block diagram illustrating a representative software architecture, which may be used in conjunction with various hardware architectures herein described and used to implement various embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as the machine 1000 of FIG. 10 that includes, among other things, processors 1004, memory 1014, and I/O components 1018. A representative hardware layer 952 is illustrated and can represent, for example, the machine 900 of FIG. 9. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke application programming interface (API) API calls 908 through the software stack and receive a response as in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
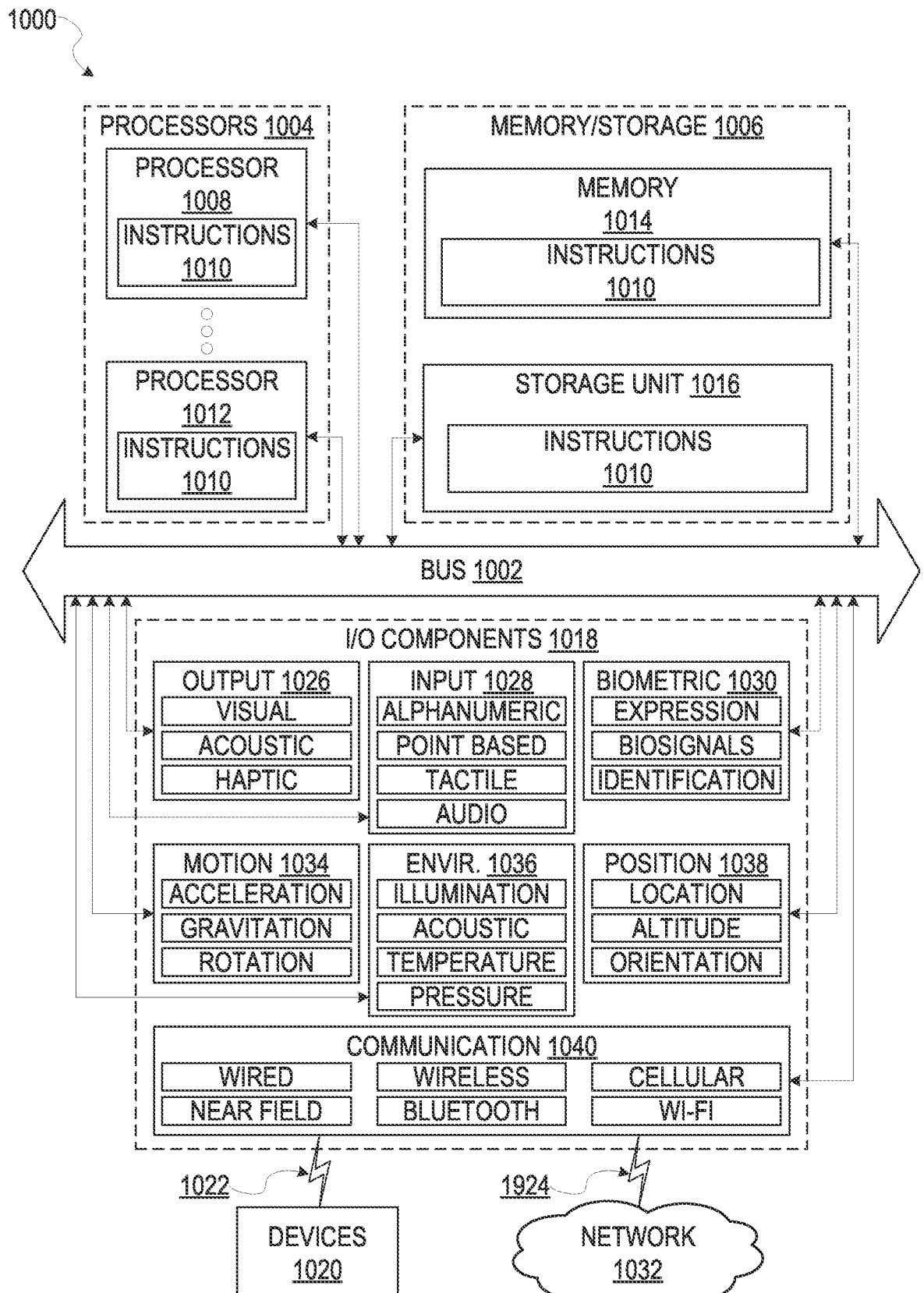
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:
1. A method comprising:
causing display of a presentation of an avatar based on a first display state, the avatar associated with a user, and the first display state corresponding with a first set of graphical elements associated with the avatar;
receiving a message that includes a text string that comprises a number of characters;
detecting a trigger event based on the number of characters of the text string transgressing a threshold value;

determining a second display state that corresponds with the trigger event, the second display state corresponding with a second set of graphical elements associated with the avatar; and causing display of the presentation of the avatar based on the second set of graphical elements that correspond with the second display state.

2. The method of claim 1, wherein the message comprises message attributes, and the detecting the trigger event includes:

detecting the trigger event based on the message attributes of the message.

3. The method of claim 2, wherein the message attributes include a timestamp, and wherein the detecting the trigger event includes:

detecting an expiration of a period of time from the timestamp.

4. The method of claim 1, wherein the message comprises message content, the message content including a word count, and the detecting the trigger event includes:

determining the word count of the message transgresses a threshold value.

5. The method of claim 1, wherein the message includes an ephemeral message that comprises a display duration.

6. The method of claim 1, further comprising:

causing display of the message within a message feed;

causing display of the presentation of the avatar at a position proximate to the message within the message feed.

7. A system comprising:

a memory; and at least one hardware processor coupled to the memory and comprising instructions that causes the system to perform operations comprising:

causing display of a presentation of an avatar based on a first display state, the avatar associated with a user, and the first display state corresponding with a first set of graphical elements associated with the avatar;

receiving a message that includes a text string that comprises a number of characters;

detecting a trigger event based on the number of characters of the text string transgressing a threshold value;

determining a second display state that corresponds with the trigger event, the second display state corresponding with a second set of graphical elements associated with the avatar; and causing display of the presentation of the avatar based on the second set of graphical elements that correspond with the second display state.

8. The system of claim 7, wherein the message comprises message attributes, and the detecting the trigger event includes:

detecting the trigger event based on the message attributes of the message.

9. The system of claim 8, wherein the message attributes include a timestamp, and wherein the detecting the trigger event includes:

detecting an expiration of a period of time from the timestamp.

10. The system of claim 7, wherein the message comprises message content, the message content including a word count, and the detecting the trigger event includes:

determining the word count of the message transgresses a threshold value.

11. The system of claim 7, wherein the message includes an ephemeral message that comprises a display duration.

12. The system of claim 7, further comprising:

causing display of the message within a message feed;

causing display of the presentation of the avatar at a position proximate to the message within the message feed.

13. A non-transitory machine-readable storage medium comprising instructions that, when executed by one or more processors of a machine, cause the machine to perform operations comprising:

causing display of a presentation of an avatar based on a first display state, the avatar associated with a user, and the first display state corresponding with a first set of graphical elements associated with the avatar;

receiving a message that includes a text string that comprises a number of characters;

detecting a trigger event based on the number of characters of the text string transgressing a threshold value;

determining a second display state that corresponds with the trigger event, the second display state corresponding with a second set of graphical elements associated with the avatar; and causing display of the presentation of the avatar based on the second set of graphical elements that correspond with the second display state.

14. The non-transitory machine-readable storage medium of claim 13, wherein the message comprises message attributes, and the detecting the trigger event includes:

detecting the trigger event based on the message attributes of the message.

15. The non-transitory machine-readable storage medium of claim 14, wherein the message attributes include a timestamp, and wherein the detecting the trigger event includes:

detecting an expiration of a period of time from the timestamp.

16. The non-transitory machine-readable storage medium of claim 13, wherein the message comprises message content, the message content including a word count, and the detecting the trigger event includes:

determining the word count of the message transgresses a threshold value.

17. The non-transitory machine-readable storage medium of claim 13, wherein the message includes an ephemeral message that comprises a display duration.

* * * * *